United States Patent
Ronning et al.

(10) Patent No.: US 9,215,844 B2
(45) Date of Patent: Dec. 22, 2015

(54) VACUUM COLLECTOR ASSEMBLY FOR LAWN TRACTORS

(71) Applicants: Norman Edward Ronning, Cass Lake, MN (US); Paul Nels Ronning, Cass Lake, MN (US)

(72) Inventors: Norman Edward Ronning, Cass Lake, MN (US); Paul Nels Ronning, Cass Lake, MN (US)

(*) Notice: Subject to any disclaimer, the term of this patent is extended or adjusted under 35 U.S.C. 154(b) by 249 days.

(21) Appl. No.: 13/694,511

(22) Filed: Dec. 7, 2012

(65) Prior Publication Data

US 2013/0160415 A1    Jun. 27, 2013

Related U.S. Application Data

(60) Provisional application No. 61/630,263, filed on Dec. 7, 2011.

(51) Int. Cl.
*A01D 43/06* (2006.01)
*A01D 43/077* (2006.01)

(52) U.S. Cl.
CPC .................... *A01D 43/077* (2013.01)

(58) Field of Classification Search
CPC .................................................. A01D 43/077
USPC .......................... 56/202, 205, 203, 16.6, 13.3
See application file for complete search history.

(56) References Cited

U.S. PATENT DOCUMENTS

| | | |
|---|---|---|
| 1,865,365 A | 6/1932 | Foote |
| 2,924,463 A | 2/1960 | Livermont |
| 3,338,594 A | 8/1967 | Schuler |
| 4,026,365 A | 5/1977 | Andersson et al. |
| 4,087,111 A | 5/1978 | Williams |
| 4,567,623 A * | 2/1986 | Walton ............................ 15/337 |
| 4,607,996 A | 8/1986 | Koch |
| 4,761,943 A | 8/1988 | Parker et al. |
| 4,770,440 A | 9/1988 | Lander |
| 4,881,362 A * | 11/1989 | Parker et al. .................... 56/202 |
| 4,922,696 A | 5/1990 | Burns et al. |
| 5,058,844 A | 10/1991 | Webb |
| 5,240,461 A | 8/1993 | Hohnl |

(Continued)

OTHER PUBLICATIONS

Trac-Vac Model 652 Operating and Assembly Manual, Apr. 1999, Palmor Products, Inc., Thorntown, Indiana, USA.

(Continued)

*Primary Examiner* — Thomas B Will
*Assistant Examiner* — Mai Nguyen
(74) *Attorney, Agent, or Firm* — Michael A Mochinski

(57) ABSTRACT

A vacuum collector assembly comprises a mountable hitch having support posts connected to one another by horizontal supports and a hinge mechanism for connecting to a trailing carriage. The trailing carriage includes a lift assembly and an engine support frame for mounting thereon an engine operating conjunctively with an impeller assembly for developing negative pressure within a blower housing that is connected in between a receptacle hood and a lawn cutting deck. The engine support frame generally extends outwardly from a pair of vertical columns each having ends connected to support runners for situating atop thereof a pair of receptacles holders suited for receiving receptacle bins utilized in storing collected debris. The lift assembly comprises side arms functioning with a trailer jack having internal gearing made operable by an extension rod and handle assembly to facilitate rotation thereof that effects lifting and lowering of the trailing carriage apart and away from the mountable hitch to allow for wheeled transport and storage of the vacuum collector assembly.

20 Claims, 12 Drawing Sheets

(56) References Cited

U.S. PATENT DOCUMENTS

| | | | |
|---|---|---|---|
| 5,596,788 A * | 1/1997 | Linville et al. | 15/352 |
| 5,685,134 A * | 11/1997 | Thornburg | 56/12.9 |
| 6,029,312 A | 2/2000 | Whitney | |
| 6,308,375 B1 * | 10/2001 | Whitney | 15/347 |
| 6,588,053 B1 * | 7/2003 | Nowak | 15/340.1 |
| D492,701 S | 7/2004 | DeShong | |
| 7,043,892 B1 | 5/2006 | Kessler | |
| 2002/0105162 A1 | 8/2002 | Green | |
| 2003/0005679 A1 | 1/2003 | Buss et al. | |
| 2005/0095104 A1 | 5/2005 | Bay | |
| 2006/0017259 A1 | 1/2006 | Chapman | |
| 2007/0193239 A1 | 8/2007 | Satoski | |

OTHER PUBLICATIONS

Trac-Vac Models 652/662 Operating and Assembly Manual, Nov. 1998 (Mod.652), Mar. 1999 (Mod.662), Palmor Products, Inc., Thorntown, Indiana, USA.

\* cited by examiner

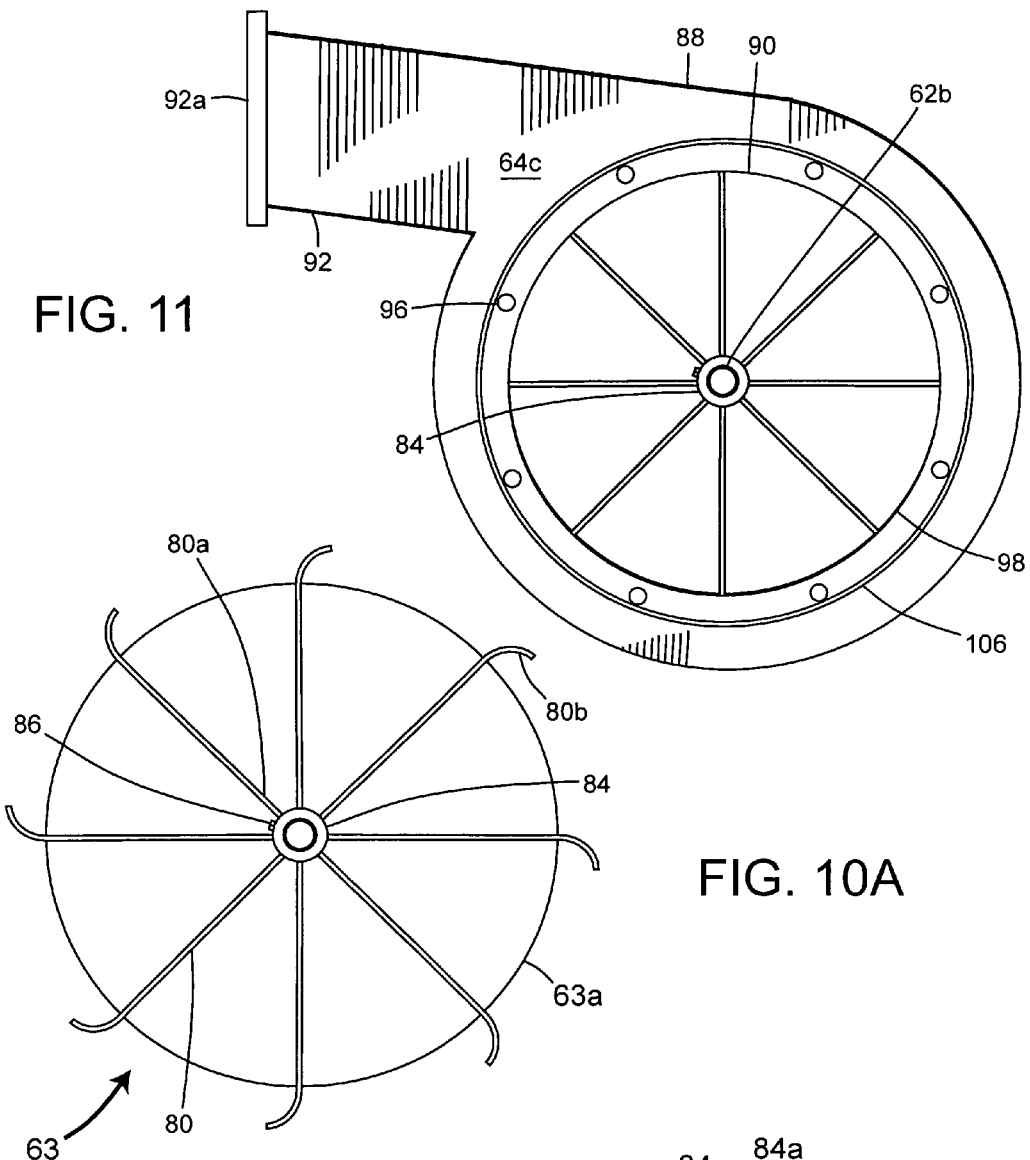
FIG. 11
FIG. 10A
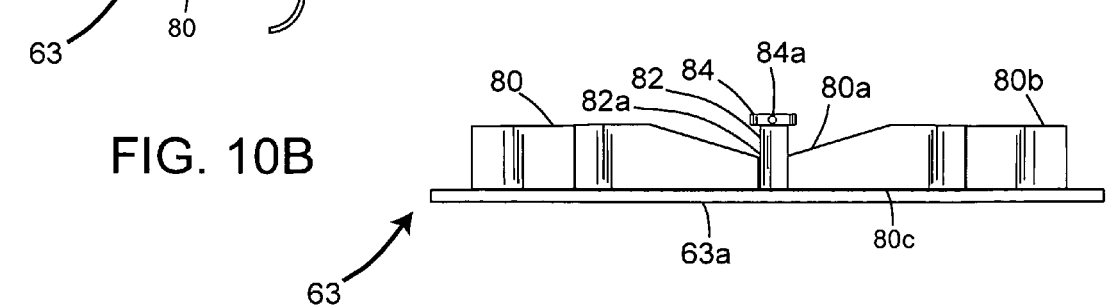
FIG. 10B

VACUUM COLLECTOR ASSEMBLY FOR LAWN TRACTORS

CROSS-REFERENCE TO RELATED APPLICATIONS

This application claims the benefit of U.S. provisional patent application No. 61/630,263, filed Dec. 7, 2011, entitled "Vacuum Collector Assembly for Lawn Tractors," the disclosures of which, including all attached documents, are incorporated herein by reference in their entirety for all purposes

FIELD OF THE INVENTION

The present invention relates in general to a vacuum collector assembly for utilization with a powered lawn tractor specifically equipped to mow and trim a lawn surface comprising a variety of grasses, weeds and other natural growths. In particular, the vacuum collector assembly, when used in conjunction with the lawn tractor, establishes an overall center of gravity that is conducive to maintaining stable operation of the lawn tractor which in turn contributes to efficient and comprehensive collection of grass and weed clippings and other loose debris, such as leafs, twigs and small branches, from the lawn surface.

BACKGROUND OF THE INVENTION

The art offers numerous forms of lawn machinery for which is directed and suited to trim and manicure a lawn surface comprising a variety of grasses, weeds and other natural growths. A self-propelled, rear-mounted powered lawn tractor is one form of lawn machinery specifically equipped and suited to trim and manicure a larger lawn surface and/or address cutting of a lawn surface having overgrown or dense grass growth. This form of lawn machinery, in particular, may include structural provisions for allowing an individual operator to ride atop and along the lawn tractor during grass cutting operations. In most design configurations, the lawn tractor comprises a primary motor rearwardly situated above a set of rear wheels which is functionally directed to turning a plurality of gears and/or belts that simultaneously serves to rotate a set of grass-cutting blades contained within a blade housing or mower deck, generally positioned below a tractor's decking or platform, and turn a set of wheels to propel the lawn tractor in a forward and/or reverse direction. Commonly associated with the blade housing is a chute that serves as a preferentially pathway for emitting and ejecting grass and weed clippings from the blade housing. Due to the inherent limitations of the primary motor and grass-cutting blades operating thereunder to sufficiently advance and emit the grass clippings from the blade housing while cutting dense grass growth or, more importantly, the desire to rid the lawn surface of grass clippings, the lawn tractor, particularly of the type that carries or transports the operator, may be further equipped with a vacuum collector attachment. The vacuum collector attachment in this strict application may comprise means for generating a vacuum or negative pressure and collecting and containing releasable debris in some form of receptacle for transport and later disposal. The vacuum pressure, particularly in this regard, may be developed from a secondary motor that turns an output shaft fitted with one or more impellers housed within a vacuum chamber, sufficiently of which to generate a vacuum or negative pressure capable of removing grass clippings from the blade housing. Supplementing the vacuum chamber of the vacuum collector attachment is a flexible pipe or conduit connected in between the chute and an entry port of the vacuum chamber. In minimizing the loss of developed vacuum pressure, the vacuum chamber's exit port is directly connected to an entry port of an overhead chamber situated atop one or more collector bins. Structural provisions are generally included within the design of the overhead chamber to permit gradual release of pressure after debris is collected within each of the collector bins. As with most typical configurations noted in the art, the vacuum collector attachment and its operable components expressed herein are collectively mounted on a towable trailer to allow for release and convenient storage apart from the lawn tractor, such as the type commercially offered and manufactured by Palmor Products of Thorntown, Ind., as Trac-Vac Model 652.

Although this particular model as well as many of the towable vacuum attachments offered in art may adequately serve to collect and contain grass clipping and the like from the lawn surface, each is generally noted to compromise the handling and operation of the lawn tractor due to an appreciable increase in length arising from its attachment. Additionally, as each of the collector bins becomes filled to capacity, the center of gravity of the lawn tractor and vacuum collector attachment is re-established more rearwardly behind the lawn tractor, thus undesirably contributing to ineffective handling and operation of the lawn tractor, particularly as one manages short-radius turns and/or engages in ascending and descending operational runs. In further respects, the overall length of the lawn tractor when combined with the towable vacuum collector attachment contributes to appreciable reductions of vacuum pressure, primarily due to the increased effective length of the flexible pipe or conduit extending from the chute to the rearward-positioned vacuum chamber and by the over presence of pipe bends along the pipe's route toward the vacuum chamber. Consequently, the pipe's resultant operational length and its bending configuration contribute to periodic clogging of the pipe and/or buildup at one or more pipe bends, thus necessitating disassembly and re-assembly of the pipe's connections for cleaning so that one can restore the free or unrestricted flow of debris within the pipe and ultimately regain proper, efficient operation of the lawn tractor.

Accordingly, there remains a need for a vacuum collector assembly that is most suited for adaptation to a lawn tractor of the type having a motor generally in a rear-mount arrangement, particularly of which contributes to safe and stable operation of the lawn tractor while yielding efficient and comprehensive collection of grass cuttings and other loose debris from the lawn surface without appreciable downtime and extended maintenance requirements.

BRIEF SUMMARY OF THE INVENTION

In order to overcome the numerous drawbacks apparent in the prior art, a vacuum collector assembly has been devised for a lawn tractor of the type noted in the art to comprise a motor in a rear- or mid-mount arrangement and include structural provisions for an operator to ride atop and along therewith, primarily forward of the motor's position.

It is an object of the present invention to provide a vacuum collector assembly that is forwardly mounted more toward the lawn tractor's motor to re-establish an overall center of gravity that is conducive to maintaining stable and safe operation of the lawn tractor, even in instances of managing short-radius turns and engaging in ascending and descending operational runs.

It is an object of the present invention to provide a vacuum collector assembly that reduces the effective length of piping extending from the lawn tractor's chute to a vacuum chamber and required number of pipe bends to yield enhanced net air flows, an appreciable reduction of clogging and blocking of the piping for more efficient and comprehensive collection of grass clippings and other releasable debris, such as leafs, twigs and small branches, from the lawn surface, and greater operating efficiency of the vacuum motor, notably in terms of less fuel consumption and longer operational life.

It is yet another object of the present invention to provide a vacuum collector assembly that mounts near or adjacent to an operator of the lawn tractor to permit accessible operation and immediate control of a vacuum motor and related operable components to fulfill prompt regulation of the requisite amount of vacuum pressure.

It is another object of the present invention to provide a vacuum collector assembly that allows an individual operator to readily attach to the lawn tractor for operation and easily release it apart therefrom to allow for convenient storage.

It is another object of the present invention to provide a vacuum collector attachment that is fabricated from high-strength materials to offer prolong and reliable operation.

It is yet another object of the present invention to provide a vacuum collector assembly that yields cost savings to its owner and/or operator in terms of less downtime for repairs and maintenance of the lawn tractor and less fuel consumption for both the lawn tractor and operable components of the vacuum collector assembly.

It is yet another object of the present invention to provide a vacuum collector assembly which accomplishes the foregoing and other objects and advantages and which is economical, durable, and fully effective in performing its intended functions without unduly compromising the stock performance and operation of the lawn tractor.

In accordance with the present invention a vacuum collector assembly has been devised for adaptation to a lawn tractor of the type commonly available in the art, particularly the type including structural provisions for allowing an individual operator to ride atop and along therewith and having a motor generally positioned in a rear- or mid-mount arrangement, the vacuum collector assembly comprising a mountable hitch having forward and rearward support posts fixedly connected to one another by first, second, third, and fourth horizontal supports to form a box-framed structure; a hinge mechanism having an aligned arrangement of outward and intermediate cylinders for slidably receiving and accommodating therewithin a rod; a trailing carriage having an engine support frame for mounting atop thereof an engine operating conjunctively with an impeller assembly housed within a blower housing for developing a predetermined amount of negative pressure within the blower housing, the engine support frame generally extending outwardly from and connected to a pair of vertical, columns each having a bottom end connected to upper and lower support runners for situating atop thereof a pair of receptacles holders suited to support and retain a pair of receptacle bins utilized in storing lawn clippings and like debris collected from a lawn cutting deck of the lawn tractor; and a lift assembly having a left and right side arms each comprising a first end equipped with a wheel and a second end pivotally connected to the lower support runner, the left and right arms being further supported and connected by a crossbeam that supplements in attaching thereto a trailer jack having internal gearing made operable by an extension rod and handle assembly to facilitate rotation thereof that effects lifting and lowering of the trailing carriage apart and away from the mountable hitch to allow for wheeled transport and storage of the vacuum collector assembly.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which:

FIG. 10A is a front elevational view of the preferred embodiment of the present invention illustrating an impeller assembly comprising a sleeve fitted with a set screw for engaging a shaft associated with an engine;

FIG. 10B is a side elevational view of the preferred embodiment of the present invention illustrating an impeller assembly comprising blades extending outwardly from a sleeve;

FIG. 11 is a right side elevational view of the preferred embodiment of the present invention illustrating a blower housing comprising an opening for accessing an impeller assembly housed therewithin and an exit port for connection to a receptacle hood;

DETAILED DESCRIPTION OF THE INVENTION

While this invention is susceptible of being embodied in many different forms, the preferred embodiment of the invention is illustrated in the accompanying drawings and described in detail hereinafter with the understanding that the present disclosure purposefully exemplifies the principles of the present invention and is not intended to limit the invention to the embodiments illustrated and presented herein. The present invention comprises utilitarian features for effectively and efficiently removing and collecting grass clippings and related debris from a lawn surface and other natural growth areas for later disposal, while retaining stability of the lawn tractor during operational runs.

Figure 1:
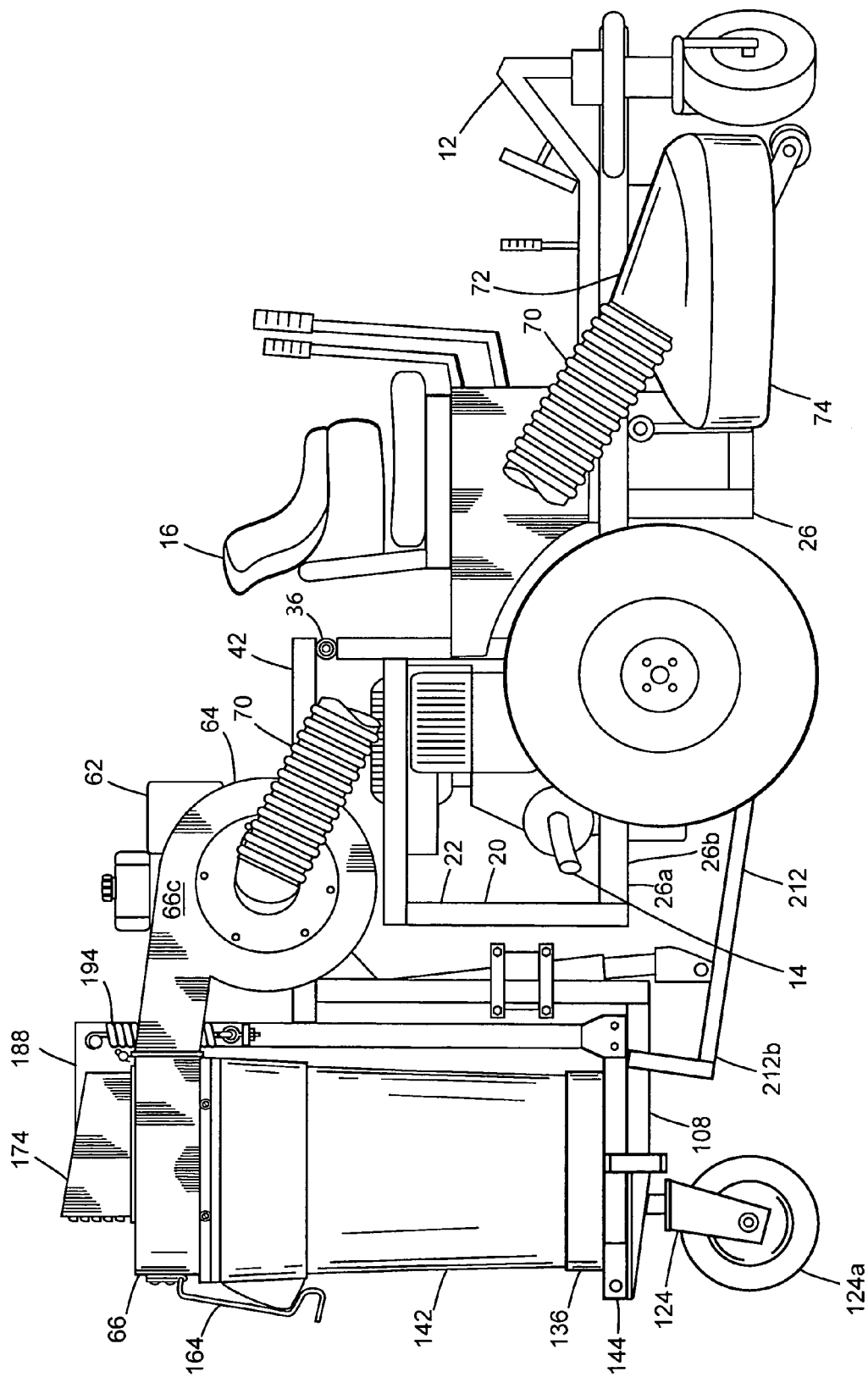
FIG. 1 is a side perspective view of the preferred embodiment of the present invention illustrating a mountable hitch and a trailing carriage attached to a rear side of a lawn tractor.
Figure 2:
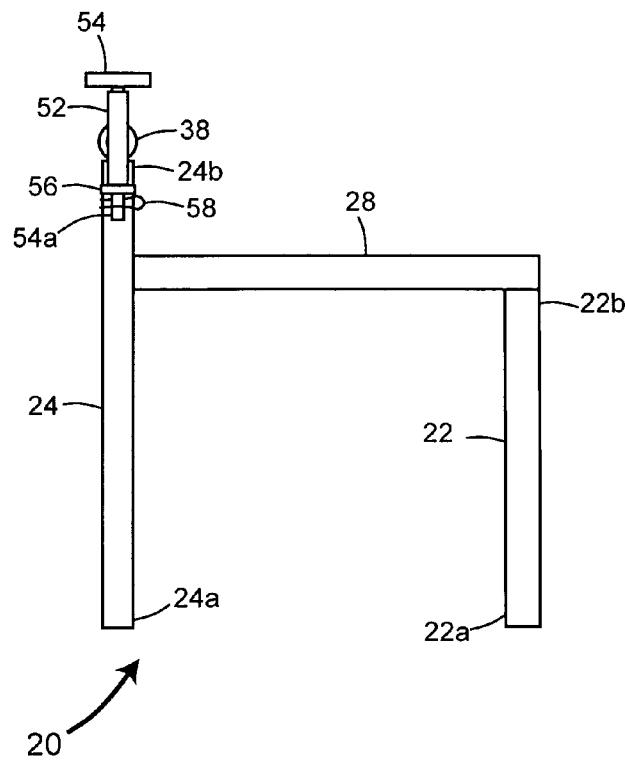
FIG. 2 is a side elevational view of the preferred embodiment of the present invention illustrating a mountable hitch comprising rearward and forward support posts connected to a first horizontal support and a rod fitted at its end with a handle lock assembly.
Figure 3:
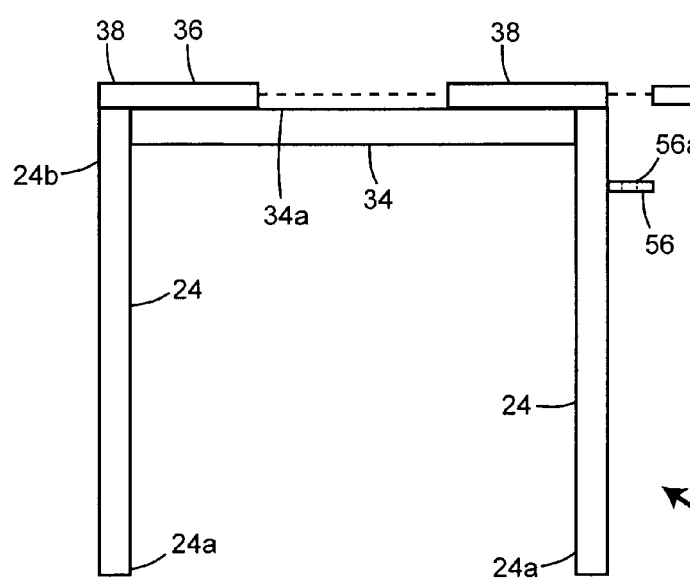
FIG. 3 is a front elevational view of the preferred embodiment of the present invention illustrating a pair of forward support posts connected together in a parallel arrangement by a fourth horizontal support and a handle connected to a rod for insertion within a pair of outward cylinders fixedly attached to an upper surface of the fourth horizontal support.
Figure 3:
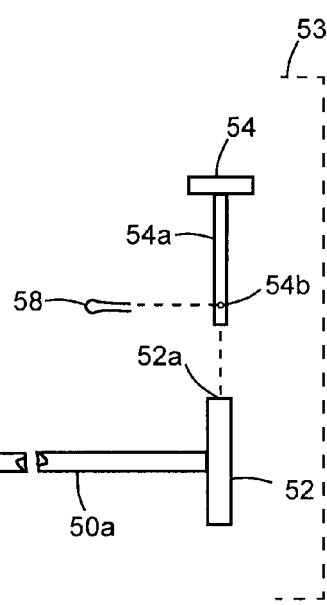

Referring now to FIG. 1, there is shown generally at 10 vacuum collector assembly attached to a self-propelled lawn tractor 12 of the type generally known in the art to comprise a rear-mounted engine 14 and structural seating provisions 16 for allowing an individual operator to ride atop and along therewith while attentively engaged in the operational activity of cutting and manicuring a lawn surface. Attachment of a trailing carriage 18 of the vacuum collector assembly to the lawn tractor is preferably maintained by means of a mountable hitch 20 having pairs of rearward and forward support posts 22, 24 each with connective ends 22a, 24a configurably suited to coincide with and structurally connect to preselect areas 26a of a main frame 26 of the lawn tractor as represented in FIG. 1. Upper portions 22b, 24b of the rearward and forward support posts are rigidly connected to one another by means of first, second, third, and fourth horizontal supports 28, 30, 32, 34 with the first and second horizontal supports 28, 30 extending between each sideward set of rearward and forward support posts, substantially being positioned in a parallel relationship with one another and longitudinally with the tractor's main fame 26, and the third and fourth horizontal supports 32, 34 extending between each of the pairs of rearward and forward support posts, respectively, substantially positioned in a parallel relationship with one another and perpendicular to the first and second horizontal supports. The resultant, box-framed structure of the mountable hitch 20, as generally depicted in FIGS. 2 and 3, preferentially resides above a rearward section 26b of the lawn tractor's main frame 26 and in some instances, above the rear-mounted engine 14, a location primarily being dictated by the manufacturer of the lawn tractor. However, in instances where the mountable hitch 20 can exist above or reside in close proximity to the rear-mounted engine as illustrated in FIG. 1, where most weight is typically centered, operational stability of the lawn tractor is not unduly compromised, but appreciably maintained, as the trailing carriage 18 rides behind the lawn tractor 12. It is contemplated within the scope of the present invention that the mountable hitch 20 may comprise alternative configurations than that specified or described above to accommodate the unique or proprietary structure of the tractor's main frame 26 such that the structural integrity of the lawn tractor and/or mountable hitch 20 is not unduly compromised when the vacuum collector assembly 10 is attached to the lawn tractor, particularly as it becomes heavily weighted upon the collection of lawn clippings and the like debris from the lawn surface. For instance, it is entirely conceivable, and perhaps foreseeable, that the rearward and forward support posts 22, 24 and horizontal supports 28, 30, 32, 34 connectively associated therewith may increase in combined number or comprise alternative configurations, such as in terms of shape and length, in order to satisfactorily fulfill the structural and integrity requirements noted above.

Figure 4:
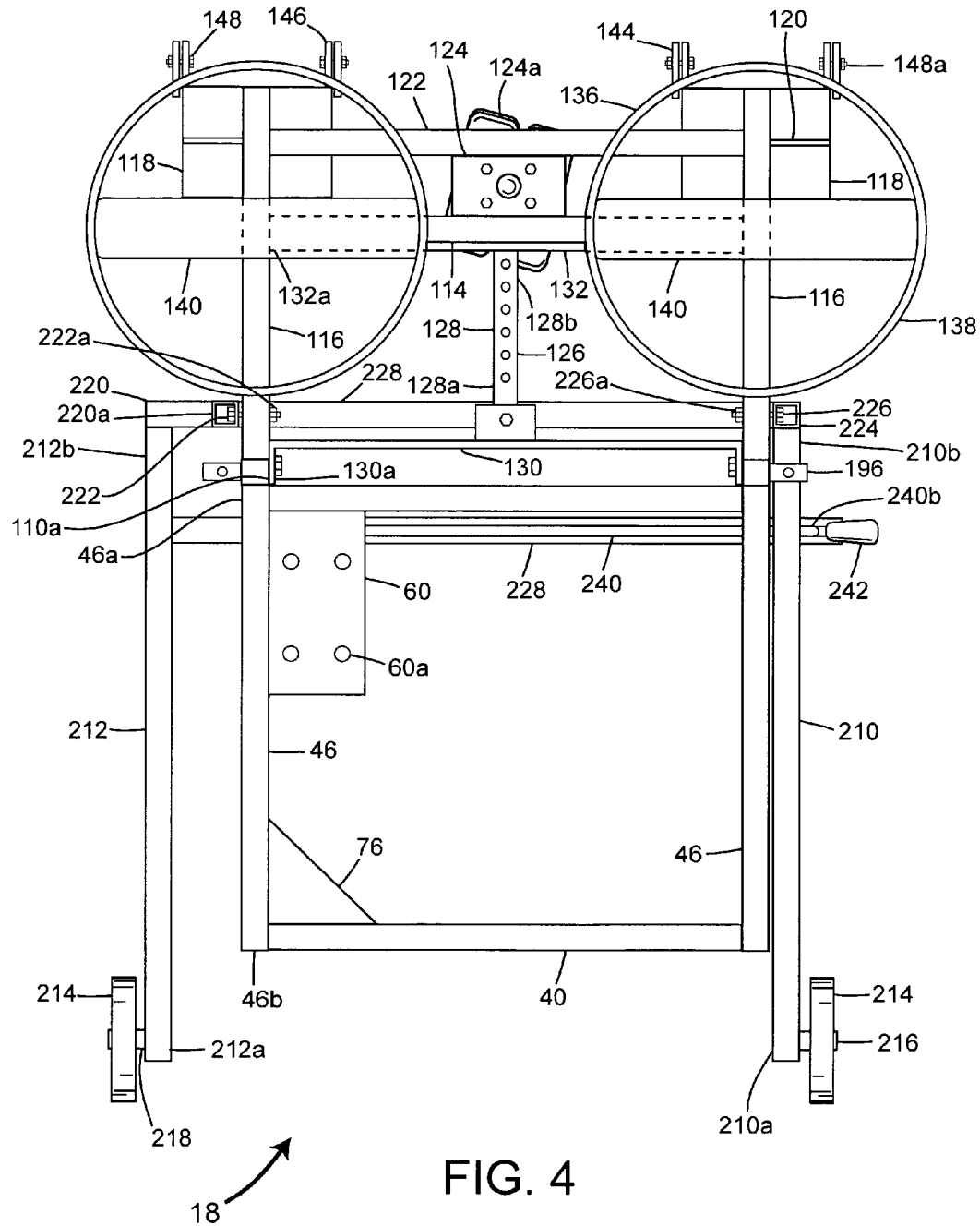
FIG. 4 is a top plan view of the preferred embodiment of the present invention illustrating a trailing carriage comprising a pair of receptacle holders and an engine support frame situated above a lift assembly.
Figure 5:
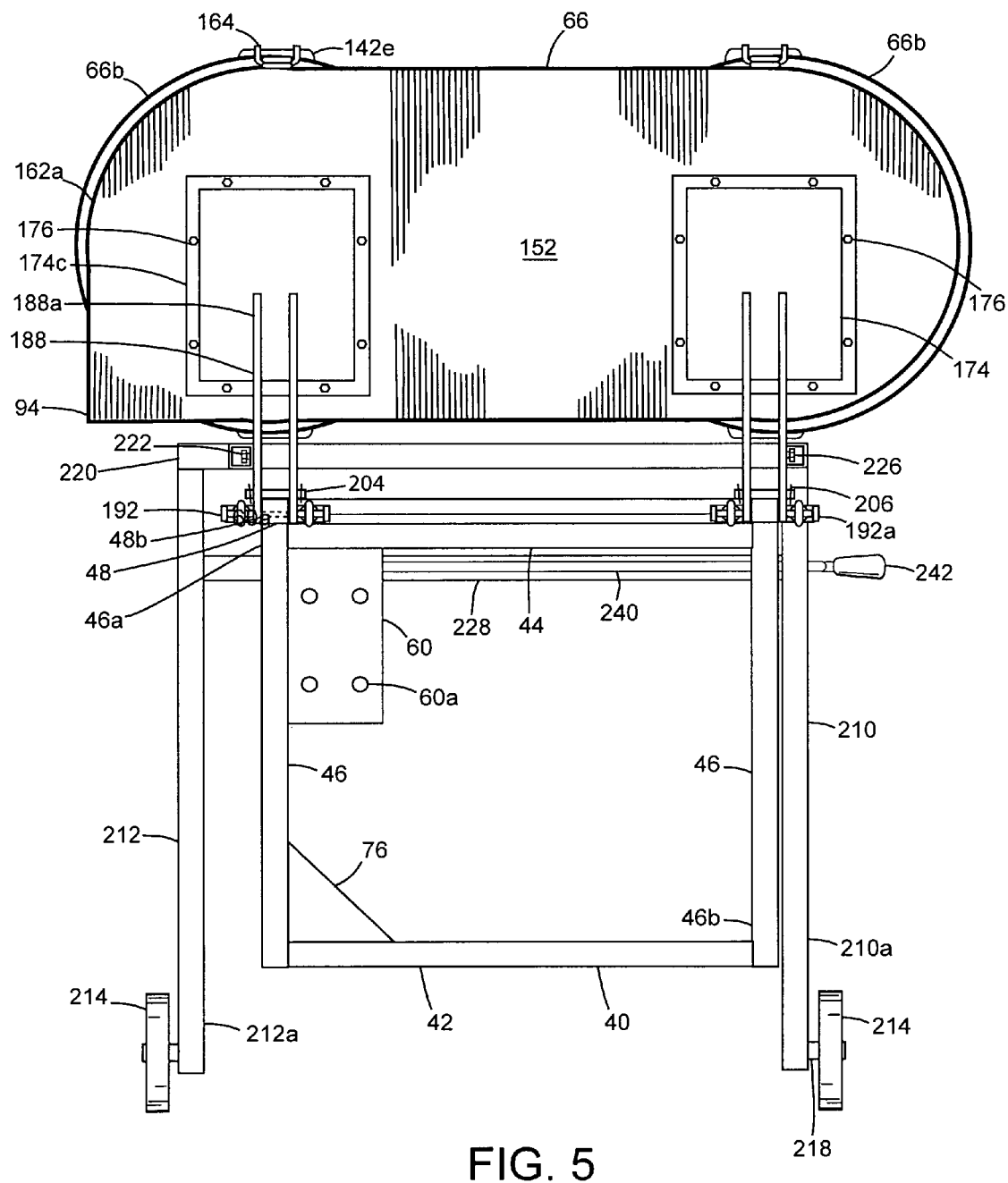
FIG. 5 is a top plan view of the preferred embodiment of the present invention illustrating a trailing carriage comprising a receptacle hood positioned above a pair of receptacles and an engine support frame connected to vertical columns and extending outwardly above and over a lift assembly.
Figure 6:
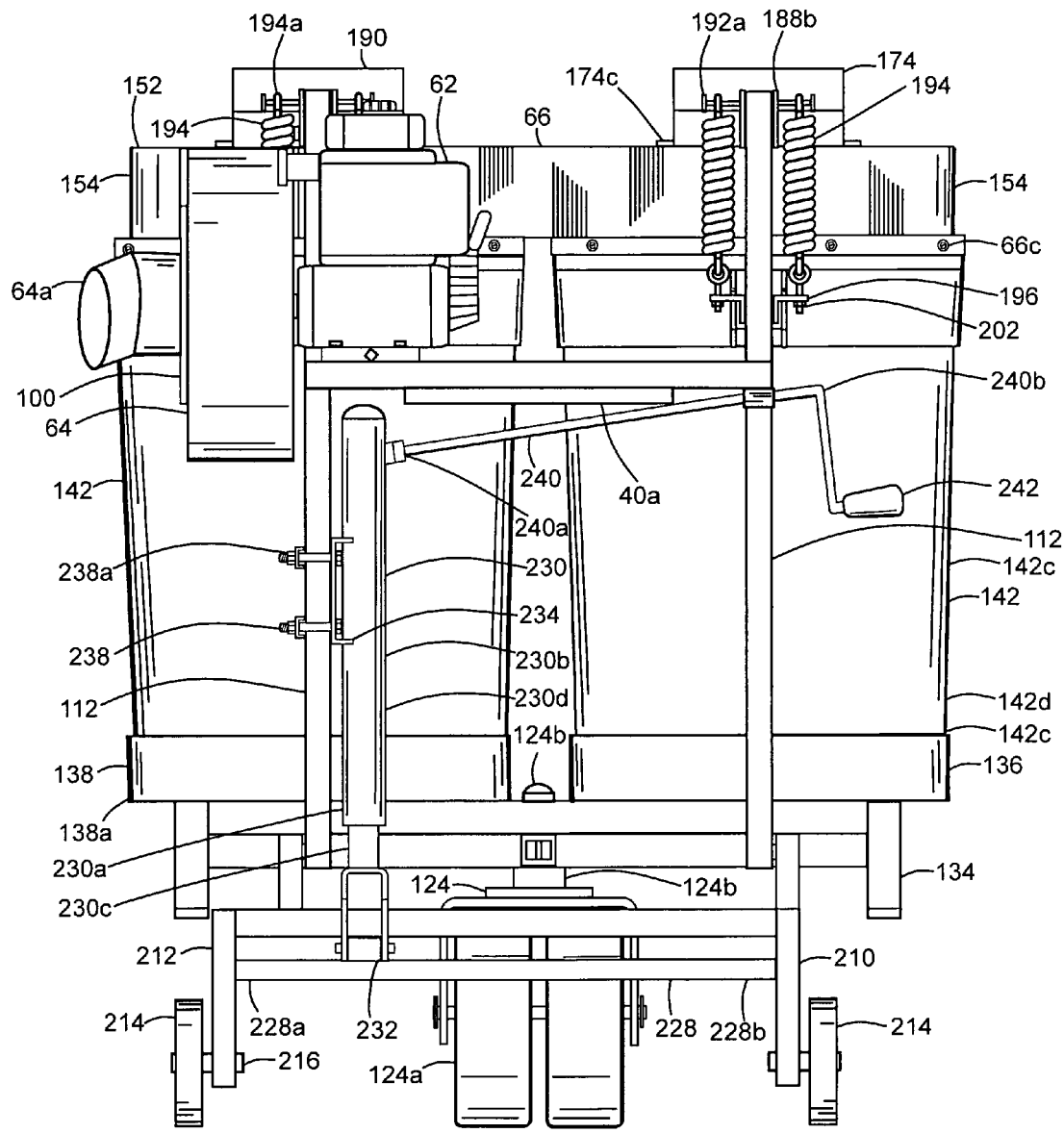
FIG. 6 is a rear elevational view of the preferred embodiment of the present invention illustrating a trailing carriage comprising an engine mounted atop an engine support frame, a receptacle hood positioned atop a pair of receptacle bins, and a pair of receptacle holders each supporting the receptacle bin in a vertical position.
Figure 7:
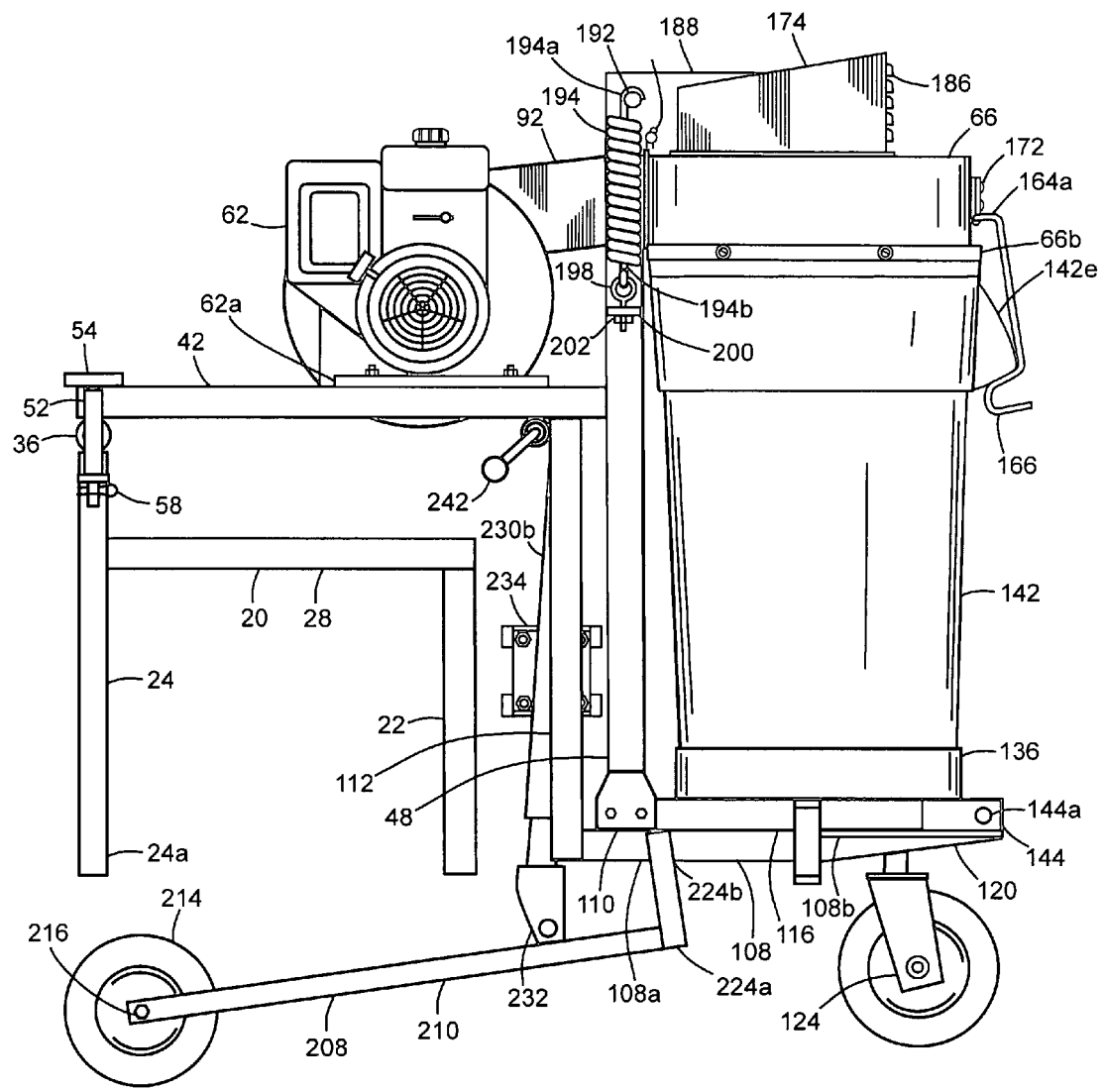
FIG. 7 is a left side elevational view of the preferred embodiment of the present invention illustrating a mountable hitch connected to a trailing carriage having an engine mounted atop an engine support frame and being supported by a lift assembly having left and right side arms each fitted with wheels.
Figure 8:
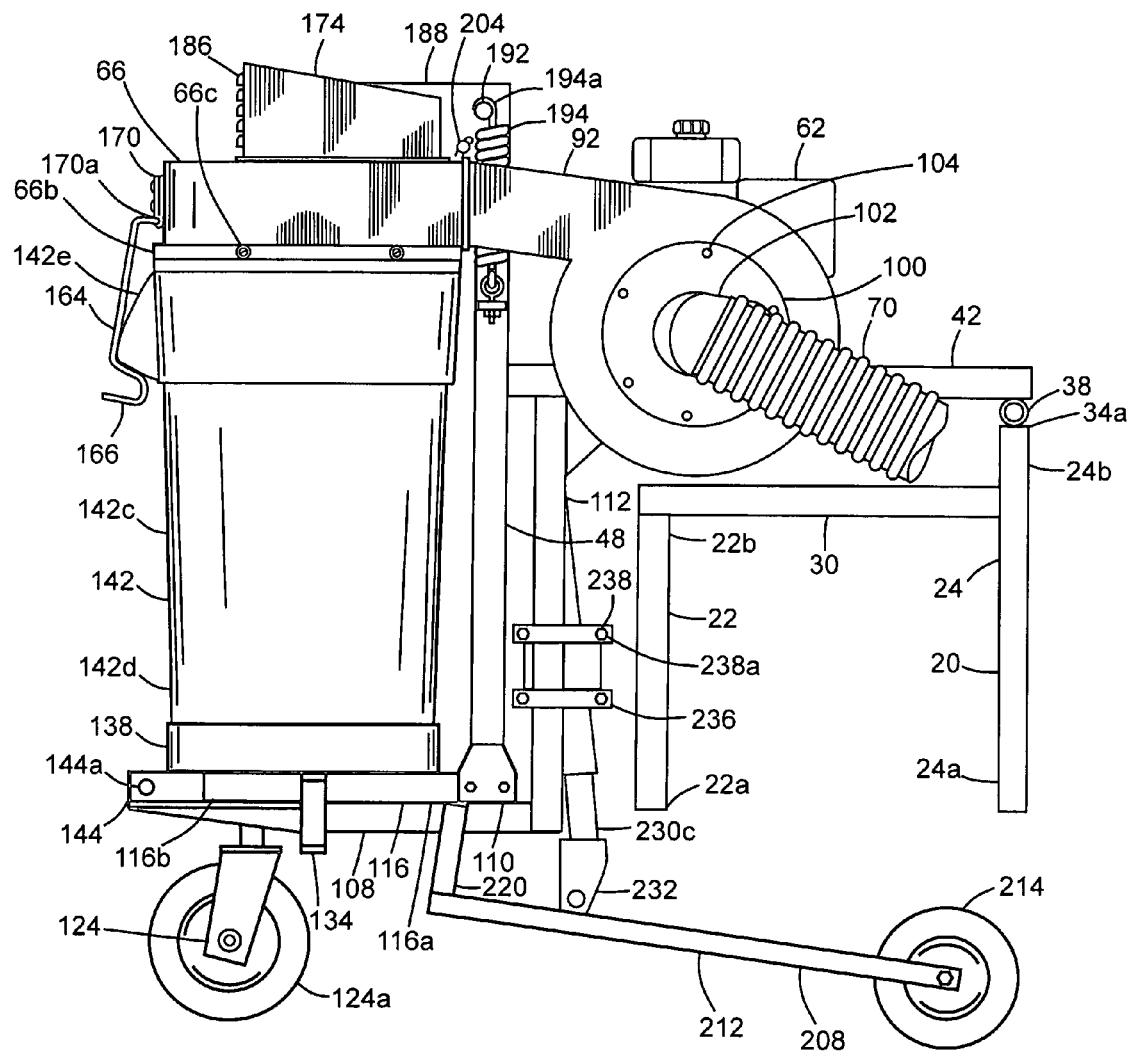
FIG. 8 is a right side elevational view of the preferred embodiment of the present invention illustrating a trailing carriage comprising a blower housing mounted to and positioned alongside an engine support frame and being supported by a lift assembly having left and right side arms fitted with wheels.

As further illustrated in FIG. 3, the fourth horizontal support 34 of the mountable hitch is associated with hinged connecting means that functionally serves to attach and detach the trailing carriage 18 to and from the mountable hitch that is affixed to the rearward section 26b of lawn tractor's main frame while supplementally serving to allow the trailing carriage to move upwardly and downwardly relative to the mountable hitch as the trailing carriage trails or follows behind the lawn tractor. In fulfilling the structural requirements to attain this preferred manner of operation and movement, hinged connecting means in the form of a hinge mechanism 36, as particularly shown in FIG. 3, comprises a pair of outward cylinders 38 fixedly attached to an upper surface 34a of the fourth horizontal support that consequently serve to accommodate thereinbetween an intermediate cylinder 40a as generally associated with a forward cross support 40 of an engine support frame 42 of the trailing carriage. The engine support frame, as generally shown in FIGS. 4 and 5, supplementarily comprises a rearward cross support 44 that is positionally held apart and away from the forward cross support, substantially in a parallel relation, by means of a pair of sideward supports 46 each having first ends 46a terminating at or near a mid-section of a pair of vertical columns 48 and second ends 46b fixedly attached to ends of the forward cross support 40, thus establishing an overall configuration where the engine support frame 42 extends outwardly from and relatively perpendicular to the vertical columns 48. In completing attachment of the trailing carriage 18 to the mountable hitch 20 by means of the hinge mechanism, as depicted in FIG. 6, a rod 50 affixed with a handle 52 at one end 50a is slidably inserted into and within the interior cylindrical spaces associated with the outward and intermediate cylinders 38, 40a such that there exists a fixed aligned arrangement of cylinders situated in between the fourth horizontal and forward cross supports, respectively. Securing the rod 50 within the aligned arrangement of outward and intermediate cylinders 38, 40a is facilitated by the presence of a handle lock assembly 53, substantially comprising a T-handle 54 having a stem section 54a that simultaneously extends through an interior cylindrical opening 52a of the handle and an aperture 56a of an angled mount 56 affixed to one of the forward support posts 24 and securely held in place by locking means, such as a cotter pin 58, a key, a spring pin, or equivalent inserted within an aperture 54b, typically in the manner shown in FIG. 7. In order to facilitate unhindered upward and downward travel of the trailing carriage 18 relative to the mountable hitch 20 as it is attached to the lawn tractor, preferentially as made possible by the hinge mechanism 36, the forward support posts are shown in FIGS. 3 and 8 to comprise a predetermined length that sufficiently allows their upper portions to extend above the upper portions of the rearward support posts, a configuration of which results in placement of the engine support frame a predetermined distance above the fixed, mounted location of the first, second, and third horizontal supports of the mountable hitch.

Referring now to FIGS. 4 and 5, the engine support frame 42 supplementarily comprises a mount plate 60 for mounting and attaching thereon vacuum power means, particularly in the form of an engine 62 configured with an impeller assembly 63 housed within a blower housing 64 that cooperatively serves to develop and maintain a predetermined amount of negative or vacuum pressure within the blower housing 64 so as to facilitate passing of an air and debris mixture into a receptacle hood 66. The mount plate in this regard may comprise one or more apertures 60a for accepting therethrough mount bolts 68 or equivalent for attaching an engine's base 62a to the mount plate and is rearwardly located about the engine support frame 42, preferably being fixedly attached adjacent to where the rearward cross support abuts against and connects to one of the sideward supports so as to avail direct routing of a section of piping 70 between entry 64a of the blower housing and an outward chute 72 associated with a lawn cutting deck 74 of the lawn tractor. The engine support frame may be supplemented with gusset plates 76 placed within and affixed to its corners in order to adequately maintain its geometry and structural integrity while in use, particularly given the presence of vibrations and like unintended movement caused during engine operation. In its operative capacity, the present invention contemplates usage of a variety of engine types generally offered and available in the art to develop the requisite negative pressures needed to convey and collect lawn clippings and related debris from the lawn surface. In the instance of the preferred embodiment, a four-stroke, gasoline-powered engine operatively configured at 8 hp sufficiently serves the utilitarian objectives set forth herein, such of the type manufactured by Briggs & Stratton of Milwaukee, Wis., for example, as well as others. Regardless of the manufacturer, however, the gasoline-powered engine 62 suited for this strict application is preferably limited to a horizontal configuration to the likes shown in FIG. 9, one in particular that includes an output shaft 62b for accepting and attaching thereto an impeller assembly 63 that supplements vacuum power means. The impeller assembly is generally shown in FIGS. 10A and 10B to comprise at least two outward extending blades 80 in a balanced, opposing relation each having an inward end 80a connected to an outward side 82a of a cylindrical sleeve 82 and an outward end 80b of curvature shape to enhance conveyance of air within and through the blower housing 64 as the impeller assembly rotates therewithin. To reinforce the outward extending blades as substantially shown in FIG. 10A, the impeller assembly further comprises a backing plate 63a that is fixedly connected to a leading edge 80c of the outward extending blade. In securing the impeller assembly to the output shaft 62b of the engine, a collar 84 is affixed to an end of the sleeve and comprises an aperture 84a particularly suited for threadably receiving therein a set screw 86.

The blower housing 64, as generally represented in FIG. 11, comprises inward and outward sides 64b, 64c generally of circular shape connected along their peripheries by a continuous wall 88 to substantially form an interior circular chamber 90 for accommodating therewithin the rotation of the impeller assembly 63 and an exit port 92 connectively associated with the interior circular chamber 90 to establish a net flow of mixed air and debris into an entry port 94 associated with the receptacle hood. Attachment of the blower housing to the trailing carriage 18 is accomplished by means of bolting, riveting, or welding the inward side of the blower housing to the sideward support used for supporting the engine mount, preferably in such manner that allows the blower housing to reside adjacent in a side-by-side relationship with the engine 62. In contrast to the inward side, the outward side 64c of the blower housing is configured with a series of mounting holes 96 circumferentially surrounding an access opening 98 to allow for periodic maintenance and repair of the impeller assembly. A cover 100 integrated with an intake port 102, particularly as configured in FIG. 8, is placed over and attached to the outward side by the circumferential placement of bolts 104 about the cover's perimeter and within the mounting holes that effectuate temporary access to and servicing of the impeller assembly during non-operative conditions. A rubber gasket 106 may be placed in between the cover and outward side 64c to enhance the seal thereabout to yield greater vacuum pressures within the blower housing. Similarly, a rubber seal 92a may be placed in between the exit port of the blower housing and entry port of the receptacle hood to offer similar operating benefits.

Figure 9:
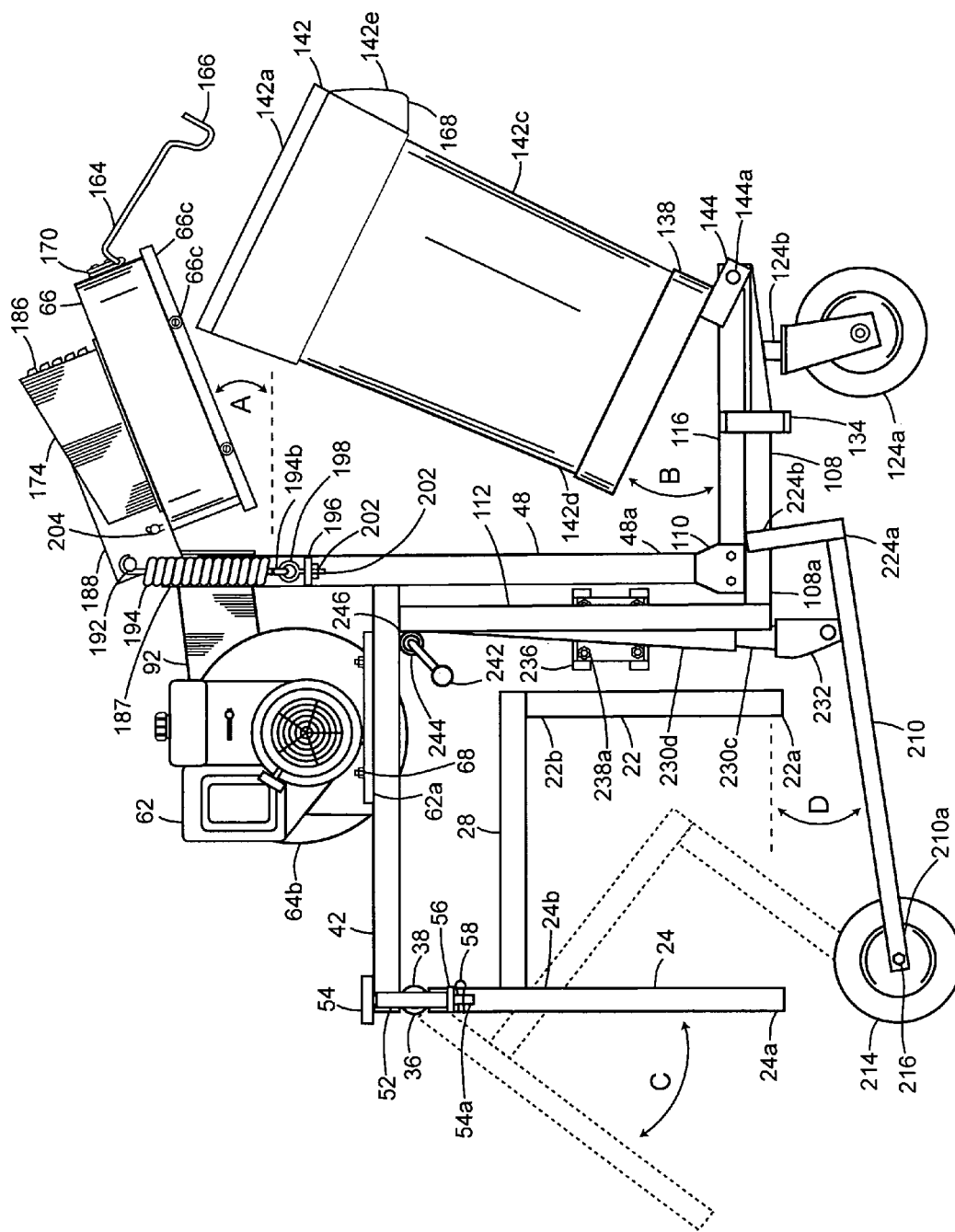
FIG. 9 is a left side elevational view of the preferred embodiment of the present invention illustrating the moveable arrangements of a mountable hitch, a receptacle holder, a receptacle hood, and a lift assembly within the operation of the present invention.

Referring now to FIG. 9, the trailing carriage 18 is structurally supplemented with a pair of lower support runners 108 with each being connected to bottom ends 48a of the vertical columns by means of side-by-side support plates 110. Each lower support runner is shown in FIG. 9 to comprise a first end 108a fixedly connected to a vertical brace 112 extending upwardly, generally being positioned parallel to the vertical column, and terminating at the sideward support to offer additional support to the engine support frame 42 while carrying the load of the engine 62 and a second end 108b connected to a primary cross brace 114. Supplementing and engagingly placed above the lower support runners and perpendicularly traversing the rearward cross support 44 is a pair of upper support runners 116 each having a first end 116a connected to the side-by-side support plates so that the upper support runner substantially exists perpendicular to the vertical column 48 and a second end 116b fixedly attached to a rearward plate 118, generally atop thereof. The rearward plate, as depicted in FIG. 4, may comprise one or more top and bottom gusted supports 120 to reinforce the connection of the rearward plate to the upper support runner. Situated in between and connected to each rearward plate 118 is a secondary cross brace 122 substantially extending parallel to the primary cross brace, wherein the primary and secondary cross braces collectively serve to connect a plate caster 124 having a pair of side-by-side wheels 124a suited for 360 degree of rotation about a center stem 124b associated therewith. Supplementing the trailing carriage's main framework, primarily as formed by the upper and lower support runners 116, 108 connected to the vertical columns and primary and secondary cross braces, is an internal support assembly 126 of the particular configuration shown in FIG. 4. The internal support assembly preferably comprises an adjustable intermediate support 128 having one end 128a connected to a u-shaped bracket 130 and a second end 128b connected to a lower cross member 132. The u-shaped bracket is generally illustrated in FIG. 4 as comprising outward ends 130a each being connected to an inward portion 110a of the side-by-side support plate, notably adjacent to the mounting location of each first end of the upper support runner. Comparatively, the lower cross member 132 generally exists below the primary cross brace 114 and extends parallel to the u-shaped bracket and comprises ends 132a each terminating at and connecting to each upper support runner 116.

Figure 12:
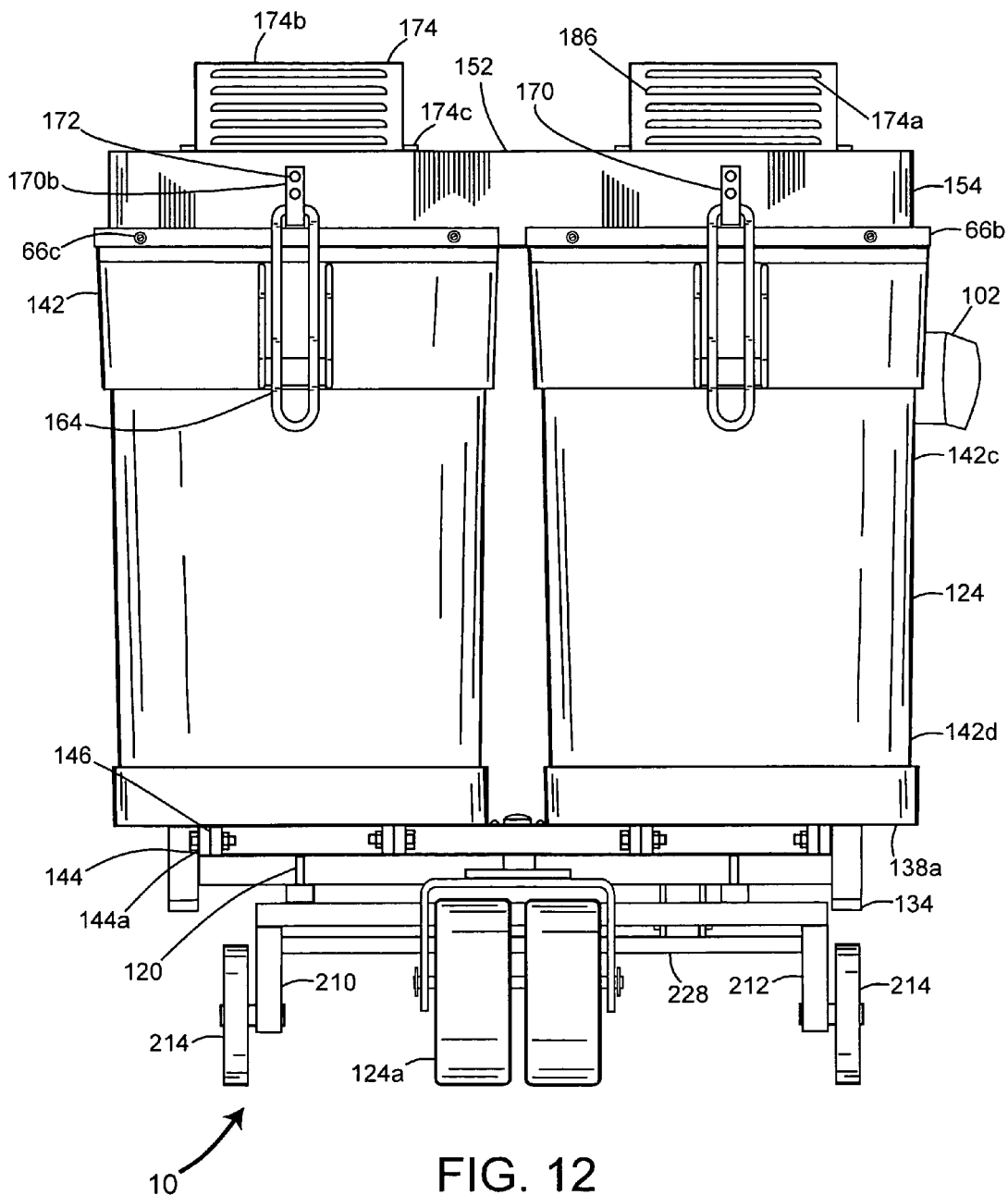
FIG. 12 is a front elevational view of the preferred embodiment of the present invention illustrating a trailing carriage comprising a pair of receptacle holders each supporting a receptacle bin and a receptacle hood having a pair of vent enclosures mounted atop thereof and being situated above the receptacle bins.

In reference now to FIG. 12, the primary cross brace 114 is further associated with a pair of outward supports 134 that cooperate with the upper and lower support runners to functionally support a pair of receptacle holders 136. Each receptacle holder is preferably shown in FIG. 4 to comprise a circular band 138 having an internal member 140 generally traversing the diameter of the circular band and serving to engage the outward support to supplementally support the receptacle holder while simultaneously supporting a receptacle bin 142 to prevent its passage therethrough. To allow and facilitate angular travel relative to the support runners, preferentially along path B in FIG. 9, each receptacle holder operates in conjunction with hinging means. Hinging means in the context of the present invention preferably comprises a pair of outward hinge plates 144 each being affixed to a lower edge 138a of the circular band 138 and positioned parallel to one another and having an aperture 144a extending therethrough and a pair of inward hinge plates 146 fixedly attached to the rearward plate 118, with each inward hinge plate extending parallel to one another and having an aperture 146a extending therethrough. A bolt 148, rod or an equivalent cylindrical structure is selectively inserted within the aligned arrangement of apertures of the outward and inward hinge plates and affixed at its ends with the bolt's head 148a, a nut or an equivalent form of structural stop.

Figure 13:
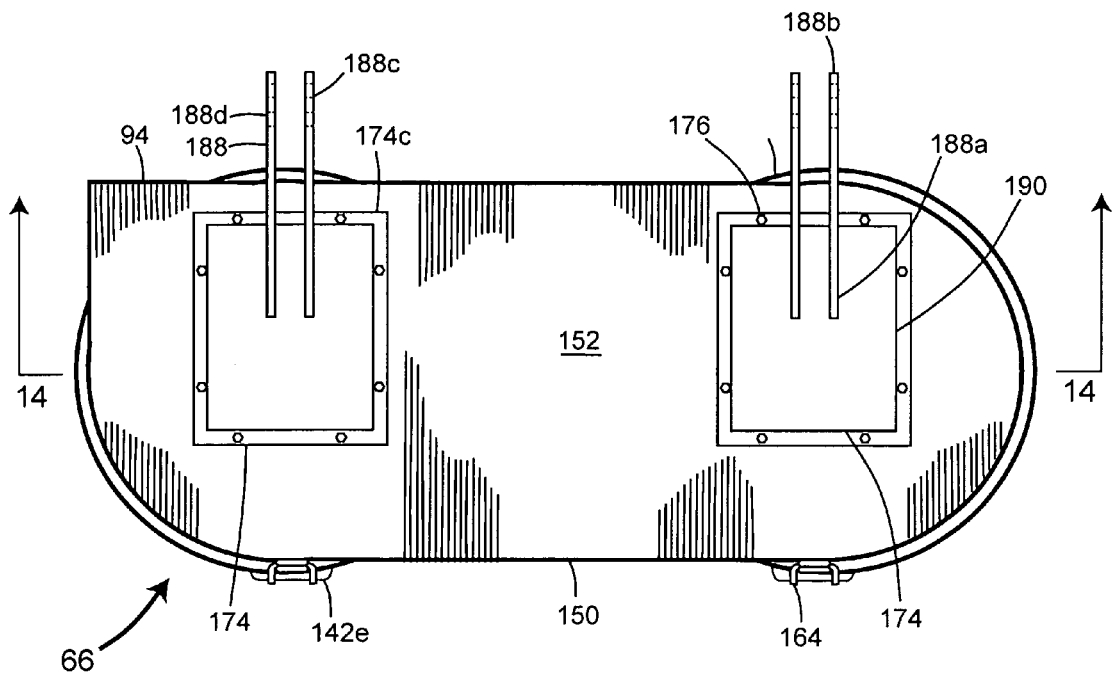
FIG. 13 is a top plan view of the preferred embodiment of the present invention illustrating a receptacle hood comprising a pair of vent enclosures mounted atop thereof with each of the vent enclosures having a side-by-side planar member affixed thereto.
Figure 14:
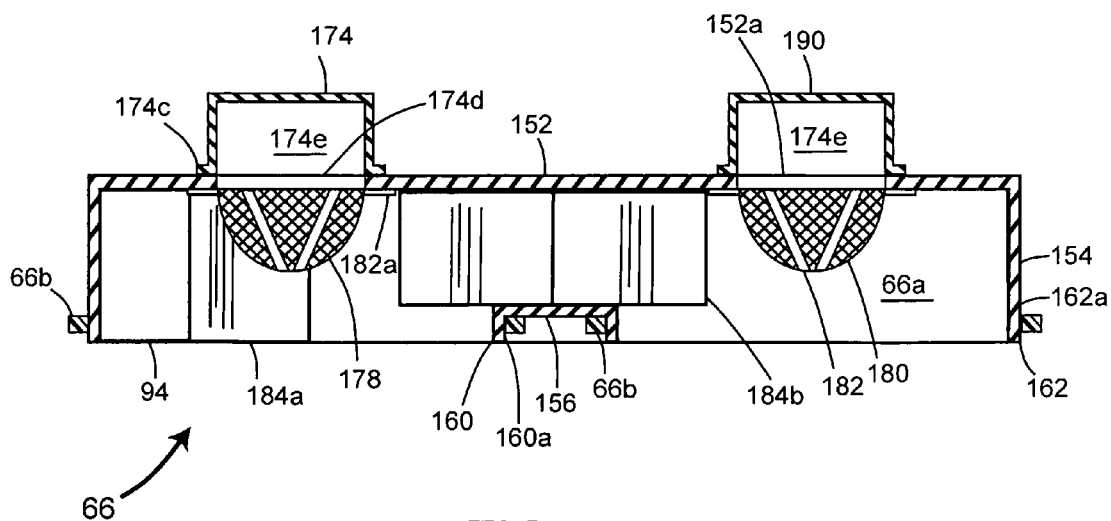
FIG. 14 is a side cross sectional view of the preferred embodiment of the present invention taken on line 14-14 of FIG. 13 illustrating a receptacle hood comprising a sidewall having a seal positioned exteriorly thereof and a pair of vent enclosures each mounted atop thereof and positioned above a vent basket hanging downwardly within an inner chamber of the receptacle hood.
Figure 15:
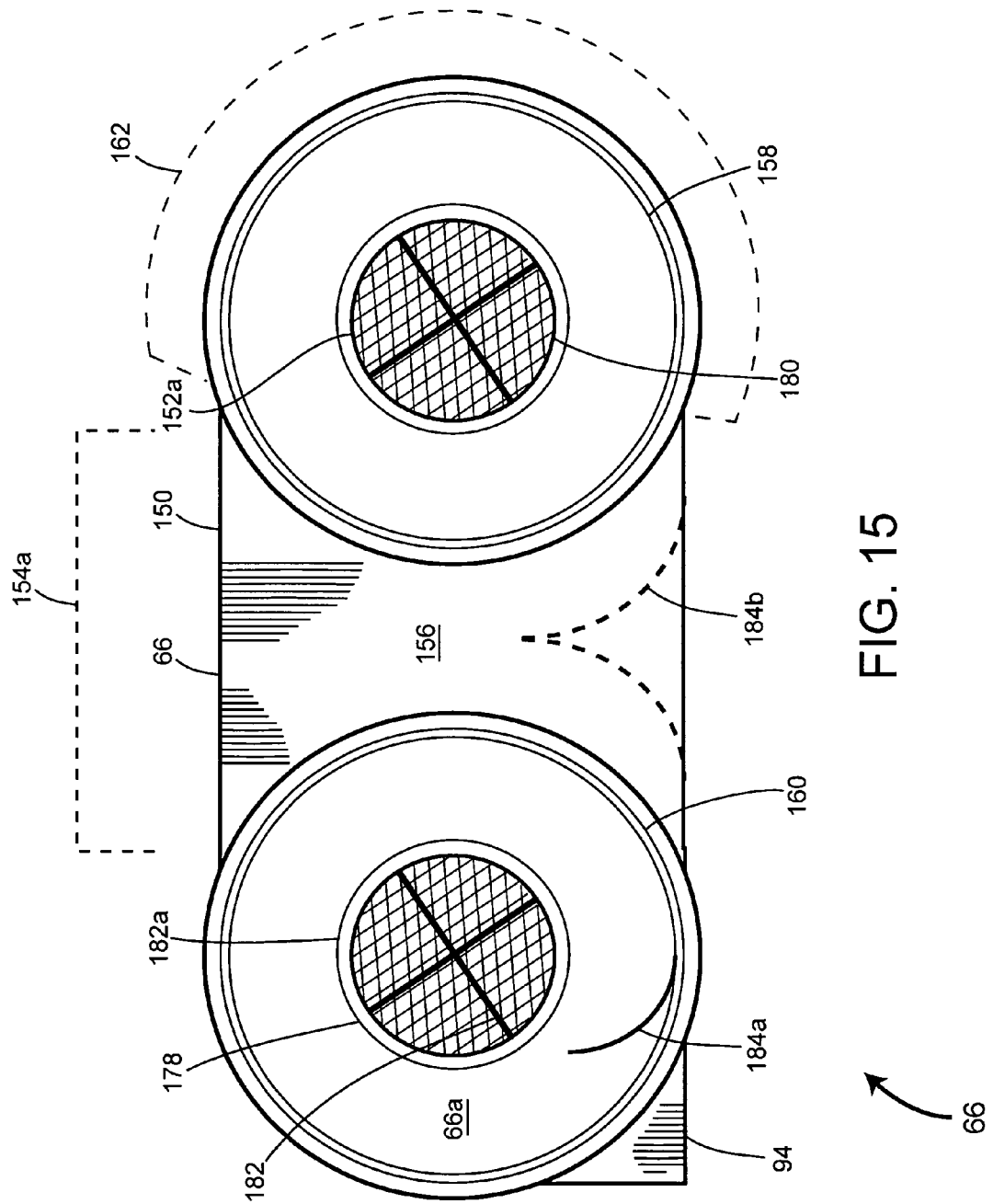
FIG. 15 is a bottom plan view of the preferred embodiment of the present invention illustrating a receptacle hood comprising a pair of receptacle openings each extending through a bottom panel and having a vent basket placed centrally therewithin.

The receptacle hood 66 of the configuration particularly shown in FIGS. 13-15 comprises an oval-shaped enclosure 150 substantially formed by a top panel 152 fixedly joined along its perimeter by a sidewall 154 and a bottom panel 156 fixedly joined to intermediate opposing sections 154a of the sidewall to form a pair of receptacle openings 158. Each receptacle opening is preferably configured to substantially coincide with an upper circumferential opening 142a of the receptacle bin such that a downward lip 160 associated with the bottom panel and an outward arcuate portion 162 of the sidewall commonly extends inwardly and downwardly partway into the receptacle bin 142. The receptacle bin of the type commonly known and available in the art and most suited for this application, such as those manufactured by Newell Rubbermaid Corporation of Atlanta, Ga., as well as others, is fabricated from heavy-weighted plastic and comprises, in addition to the upper circumferential opening 142a, a base 142b at its lower end and a tapered sidewall 142c generally extending downwardly from the upper circumferential opening toward the base such that a lower wall section 142d most near the base frictionally and tightly fits within the inner diametric confines of the circular band 138 of the receptacle holder. One or more handles 142e integral to the construction of the receptacle bin operate conjunctively with a hinged latch 164 to secure each of the receptacle bins to the receptacle hood. The hinged latch in this regard comprises an engaging member 166 configured and shaped such that it can frictionally engage a lower section 168 of the handle, while an upper section 164a of the hinged latch fits within an inner confine 170a of a foldable strap 170, substantially being formed by meeting ends 170b of the foldable strap that are connected to the sidewall of the receptacle hood, generally being connected by means of rivets 172, bolts or an equivalent form of fastener known in the art. As configured in this manner, the hinge latch 164 can pivotally travel apart and away from the handle to sufficiently allow its release therefrom and permit removal of the receptacle hood 66 relatively apart and away from the upper end of the receptacle bin.

Further associated with and situated atop the receptacle hood 66, as illustrated in FIG. 14, is venting means, which includes a pair of vent enclosures 174 each comprising a vent opening 174a on a rearward face 174b and a rim 174c extending outwardly from and along the perimeter of a lower opening 174d that serves as means for mounting the vent enclosure to the receptacle hood. In its mounted location, the lower opening is generally shown in FIG. 14 to coincide with and fit over an opening 152a extending through the top panel of the receptacle hood to commonly connect inner chambers 174e of the vent enclosure by way of the receptacle hood 66. The lower opening of the vent enclosure is centrally located relative to the aligned arrangement of the receptacle opening of the bottom panel 156 and upper circumferential opening 142a of the receptacle bin 142. Although numerous means are available for fastening the vent enclosure to the receptacle hood, such as rivets, bolts, and welds, the preferred embodiment of the present invention incorporates use of a plurality of bolts 176 placed along and extending through the rim 174c so as to afford periodic removal of the vent enclosure 174 from the receptacle hood and serve as means for mounting within the inner chamber of the receptacle hood a vent basket 178. The vent basket of the type illustrated in FIG. 15 utilizes a mesh 180 having a predetermined number of sized openings and is structurally supported by bands 182 extended to and integrally connected to a circumferential band 182a that suffices to mount the vent basket with that of the bolts 176 below the opening 152a extending through the top panel.

Further occupying the inner chamber of the receptacle hood are incoming and internal flow baffles 184a, 184b that serve to direct the incoming mixed flow of air and debris cyclonically downward into each of the receptacle bins 142, while allowing the built up positive air pressure within the inner chamber 66a of the receptacle hood to be diverted and passed into each of the vent enclosures and ultimately into the atmosphere by means of passing through and exiting the venting opening 174a and in some alternative configurations, through a louvered panel 186 optionally mounted to the rearward face 174b and over the vent opening 174a. During typical operation, the receptacle bin most distant from the entry port 94 of the receptacle hood will initially fill to capacity with debris before the closest receptacle bin relatively thereto receives any appreciable amount of collected debris, primarily of which occurs as a result of the incoming flow baffle diverting the mixed air and debris flow outwardly against and along the sidewall 154 of the receptacle hood 66. In furthering the effectiveness of diverting air and debris flows in the preferred manner noted above, the receptacle hood is equipped with exterior sealing means for sealing each of the circumferential openings generally present and formed by the connection between the upper circumferential opening of the receptacle bin and receptacle opening associated with the receptacle hood, primarily of which comprises a rubber seal 66b circumferentially placed about and mounted to exterior surfaces 162a, 160a of the outward arcuate portion 162 of the sidewall and downward lip 160 of the bottom panel, respectively.

In reference now to FIG. 9, the receptacle hood 66 comprises hood elevating means for elevating it apart and away from the receptacle bins such that the receptacle bins 142 can be effectively removed from the circular band 138 of the receptacle holder or tilted by hinging means associated with the receptacle holder 136 for periodic removal of accumulated and collected lawn clippings and like debris from the receptacle bins. In particular, hood elevating means comprises a hood raising assembly 187 dedicated to each of the vertical columns, which substantially includes a pair of side-by-side planar members 188 each having a first common end 188a fixedly mounted to an external surface 190 of the vent enclosure and a second common end 188b engaging opposing sides of the vertical column 48 to permit pivotal movement of the receptacle hood relatively about a pin 192 situated within an aligned arrangement of apertures 48b, 188c respectively extending through the vertical column and second common ends. In permitting the relative ease by which the receptacle hood pivotally travels about the pin, generally along path A in FIG. 9, the hood raising assembly further comprises a pair of springs 194 each having a first j-shaped end 194a engaging one of two protruding sections 192a of the pin and a second j-shaped end 194b connected to one of two lower spring mounts 196. In this regard, each of the spring mounts of the configuration shown in FIG. 7 comprises an eye bolt 198 having a looped end 198a for accepting the second j-shaped end 194b and a second threaded end 198b connected to one of two angle brackets 200 by means of a nut 202, whereas the angle bracket is fixedly connected to the vertical column a predetermined distance downward from the pin 192 to sufficiently stretch the spring 194 and add a preselect amount of tension thereto. In limiting the amount of downward travel of the receptacle hood, pivotally travels about the pin, the second common end 188b may incorporate use of a stop pin 204 extending through and situated within a second aperture 188d present within the second common end and affixed thereat by means of a cotter pin 206 selectively placed on each end of the stop pin.

Referring now to FIGS. 4 and 9, the trailing carriage 18 contemplates use of a lift assembly 208 for lifting the trailing carriage apart and away from the mountable hitch and lawn tractor and moving the trailing carriage for temporary storage and the like. In particular, the lift assembly 208 comprises left and right side arms 210, 212 positioned parallel to one another relatively along and below the sides of the engine support frame 42 with each side arm having first and second ends 210a, 210b, 212a, 212b. The first ends of the side arms, as depicted in FIG. 4, comprise a wheel 214 mounted by means of a through bolt 216 that serves an axle for the wheel, wherein the wheel may be positioned in offsetting manner by a spacer 218 to prevent binding and like adverse interaction with the first end. Comparatively, the second end 212b of the right side arm is generally connected to an outward end 220a of a L-shaped member 220 whereas an inward end 220b of the L-shaped bracket is pivotally connected to one of the two lower support runners by means of a bolt 222 affixed with a nut 222a. In like manner, as shown in FIGS. 4 and 9, the second end 210b of the left side arm is connected to a lower end 224a of an upright member 224 wherein an upper end 224b of the upright member is pivotally connected to the other lower support runner by means of a bolt 226 affixed with a nut 226a. In supplementing the structural integrity of the lift assembly that furthers support of the side arms, the lift assembly comprises a crossbeam 228 having first and second ends 228a, 228b connected to each of the side arms, typically in the manner shown in FIG. 4. In order to permit the desired lifting action of the trailing carriage apart from the mountable hitch, as generally observed along paths C and D in FIG. 9, the lift assembly 208 incorporates use of movable means in the form of a trailer jack 230, particularly of type offered in the art and associated with boat trailers that primarily rest upon and operate with a ground surface. In the instance of the present invention, however, the trailer jack is configured in such manner to fulfill the operational objectives set forth for the lift assembly, primarily by means of its lower end 230a being connected to a bracket 232 affixed to the crossbeam 228 and its midsection 230b being connected to one of the two vertical braces 112 associated in supplementing support of the engine support frame 42, generally on the rightward side of the lawn tractor. Although numerous means are available for attaching the trailer jack 230 to the vertical brace, the present invention preferably employs usage of a mount bracket 234 generally affixed to the trailer jack. A pair of elongate members 236 positioned on an opposing side of the vertical brace 112, relatively to that of the mount bracket, is affixed thereat by means of one or more bolts 238 each threadably fitted with a nut 238a, as generally represented in FIGS. 7 and 9. In furthering the operation of the lift assembly 208, the trailer jack 230 is fitted with an extension rod 240 having one end 240a connected to internal gearing (not shown) while a second end 240b comprises a handle 242 to facilitate rotation of the extension rod that effects internal sliding movement of a lower member 230c relatively to an upper sleeve 230d associated with the trailer jack. A sleeve 244 fixedly mounted within a corner 246 where the engine support frame 42 connects to the vertical brace 112 slidably accepts therethrough a portion of the extension rod 240 to allow its position to remain relatively fixed for rotatable operation and consequently to lower and raise the trailer jack 230.

It is obvious that the components comprising the vacuum collector assembly 10 may be fabricated from a variety of materials, providing such selection or use of materials possess the capacity to withstand the applied forces acting thereon while attached to the lawn tractor 12.

Accordingly, it is most desirable, and therefore preferred, to construct the frame members of the mountable hitch 20 and trailing carriage 18 from steel or aluminum, a material of which is considered as having a moderate strength-to-weight ratio while offering a reduced susceptibility to premature failure.

To lessen the cost and perhaps simplify construction, the vacuum collector assembly 10 is preferably fabricated with square structural tubing and welded about the numerous connections. In minimizing opportunities for corrosion if in the event steel is used in the fabrication process, the structural tubing used for the mountable hitch as well as for the trailing carriage 18 may receive one or more applied top finishes of epoxy or other durable coatings to prolong the life and use of the vacuum collector assembly 10. Alternatively, a surface coating in the form of paint applied by powder coating techniques may be used for exposed steel components of the present invention.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. A vacuum collector assembly for attachment to a lawn tractor having a rearward main frame and a lawn cutting deck equipped with an outward chute, said assembly comprising, in combination:
   a mountable hitch having pairs of forward and rearward support posts each having connective ends fixedly connected to the rearward main frame;
   a trailing carriage having an engine support frame for mounting thereon vacuum power means, said engine support frame being fixedly connected to and extending outwardly from a pair of vertical columns, said vertical columns having bottom ends respectively connected to lower support runners extending relatively perpendicular to said vertical columns, said lower support runners having ends fixedly connected to a primary cross brace to structurally support and substantially maintain a parallel relation of said lower support runners, said primary cross brace having a wheel mounted thereto for supporting and carrying said trailing carriage;

hinged connecting means for connecting said mountable hitch to said engine support frame of the trailing carriage;

at least one receptacle holder mounted atop of said lower support runners for receiving thereon an equal number of receptacle bins suited to receive and store collected debris;

a receptacle hood substantially positioned above said receptacle bin for passing therethrough collected debris destined for accumulation and collection in said receptacle bin, said receptacle hood having a receptacle opening and exterior sealing means for sealing the connection between said receptacle bin and said receptacle opening, said receptacle hood having venting means for relieving positive pressure commonly present in said receptacle hood and said receptacle bin during operation of said vacuum power means; and a lift assembly for lifting said trailing carriage apart and away from said mountable hitch, said lift assembly having left and right side arms positioned relatively parallel to one another and along and below said engine support frame, said lift assembly having movable means for raising and lowering said side arms relative to said engine support frame.

2. A vacuum collector assembly as set forth in claim 1, wherein said side arms each comprise a first end equipped with a wheel and a second end pivotally connected to said lower support runner, said movable means comprising a trailer jack mountable at its lower end to a cross beam extending between said left and right side arms and at its midsection to one of two vertical braces supplementing support of said engine support frame.

3. A vacuum collector assembly as set forth in claim 2, wherein said midsection of the trailer jack is connected to said vertical brace by a mount bracket and a pair of elongate members oppositely positioned and affixed thereto by at least a pair of bolts each threadably affixed with a nut.

4. A vacuum collector assembly as set forth in claim 2, wherein said movable means further comprises an extension rod having one end connected to internal gearing of the trailer jack and a second end having a handle to facilitate rotation of the extension rod while effecting operation of the internal gearing to internally slide a lower member relatively about and within an upper sleeve of the trailer jack to effect angular travel of said trailing carriage relative to said mountable hitch.

5. A vacuum collector assembly as set forth in claim 1, wherein said forward and rearward support posts are fixedly connected to one another by first, second, third, and fourth horizontal supports to substantially form a box-framed structure, said hinged connecting means comprising a hinge mechanism having a pair of outward cylinders fixedly attached to an upper surface of the fourth horizontal support, an intermediate cylinder mounted to a forward cross support of the engine support frame and situated in between said outward cylinders, and a rod slidably situated within an aligned arrangement of interior cylindrical spaces associated with said outward and intermediate cylinders.

6. A vacuum collector assembly as set forth in claim 5, wherein said rod comprises a handle affixed to one of its two ends and is retained within the aligned arrangement of interior cylindrical spaces by a handle lock assembly, said handle lock assembly comprising a T-handle having a stem section suited to simultaneously extend through an interior cylindrical opening of the handle and an aperture of an angled mount selectively affixed to one of said forward support posts and securely held in place by locking means.

7. A vacuum collector assembly as set forth in claim 1, wherein said vacuum power means comprises an engine having an output shaft affixed to an impeller assembly for developing negative pressure within a blower housing, said blower housing having an exit port and an intake port for receiving a section of piping extending from the outward chute.

8. A vacuum collector assembly as set forth in claim 1, furthering comprising an upper support runner positioned atop of said lower support runner and having a first end connected to said vertical column and a second end connected to a rearward plate, said receptacle holder having a circular band having an internal member generally traversing the diameter thereof to prevent passage of said receptacle bin.

9. A vacuum collector assembly as set forth in claim 8, further comprising hinging means for allowing said receptacle holder to angularly travel relatively apart from said lower support runner, said hinging means comprising a pair of inward hinge plates fixedly attached to said rearward plate and a pair of outward hinge plates fixedly attached to a lower edge of the circular band, said inward and outward hinge plates each having an aperture extending therethrough and configurably aligned for receiving and accommodating therewithin a bolt threadably affixed at its end with a nut.

10. A vacuum collector assembly as set forth in claim 1, wherein said receptacle hood comprises an oval-shaped enclosure substantially formed by a top panel fixedly joined along its perimeter by a sidewall and a bottom panel fixedly joined to bottom opposing sections of the sidewall to form said receptacle opening, said top panel having at least one opening extending therethrough to accommodate venting means.

11. A vacuum collector assembly as set forth in claim 10, wherein said venting means comprises at least one vent enclosures situated above said receptacle bin and having a vent opening on a rearward face thereof, a lower opening substantially coinciding with said opening of the top panel and said receptacle opening, and a rim extending outwardly from and along the perimeter of said lower opening to accept fastening means for fastening said vent enclosure to said top panel of the receptacle hood.

12. A vacuum collector assembly as set forth in claim 11, wherein said receptacle hood comprises an inner chamber for housing a vent basket attached to and suspended below said opening of the top panel and incoming and internal flow baffles functionally serving to direct the incoming mixed flow of air and debris cyclonically downward into said receptacle bin.

13. A vacuum collector assembly as set forth in claim 11, further comprising hood elevating means for elevating said receptacle hood apart and away from said receptacle bin, said hood elevating means comprising a hood raising assembly dedicated to each of said vertical columns, said hood raising assembly having a pair of lower spring mounts each mounted in an opposing relation on said vertical column, a pair of springs each having first and second j-shaped ends, and a pair of side-by-side planar members each having a first common end fixedly mounted to an external surface of the vent enclosure and a second common end engaging opposing sides of the vertical column, said second ends and said vertical column each having an aperture extending therethrough and configurably aligned for receiving and accommodating therewithin a pin, said pin having a pair of protruding sections each positioned in an opposing relation for receiving said first j-shaped end of the spring, said spring mount having an eye bolt with a looped end for receiving said second j-shaped end.

14. A vacuum collector assembly as set forth in claim 11, wherein said receptacle hood comprises a hinged latch having an engaging member for frictionally engaging a lower section of a handle associated with said receptacle bin and an upper section fittingly engaged within an inner confine formed by a foldable strap having meeting ends connected to said sidewall of the receptacle hood.

15. A vacuum collector assembly as set forth in claim 7, wherein said impeller assembly comprises at least two outward extending blades in a balanced, opposing relation each having an inward end connected to an outward side of a cylindrical sleeve and an outward end of curvature shape to enhance conveyance of air within and through said blower housing as said impeller assembly rotates therewithin, said outward extending blades each having a leading edge fixedly attached to a backing plate.

16. A vacuum collector assembly for attachment to a lawn tractor having a rearward main frame and a lawn cutting deck equipped with an outward chute, said assembly comprising, in combination:
 a mountable hitch having pairs of forward and rearward support posts fixedly connected to one another by first, second, third, and fourth horizontal supports to substantially form a box-framed structure, said forward and rearward support posts each having connective ends fixedly connected to the rearward main frame;
 a trailing carriage having an engine support frame for mounting thereon an engine having an output shaft affixed to an impeller assembly for developing negative pressure within a blower housing, said blower housing having an exit port and an intake port for receiving a section of piping extending from the outward chute, said engine support frame being fixedly connected to and extending outwardly from a pair of vertical columns, said vertical columns having bottom ends respectively connected to lower support runners extending relatively perpendicular to said vertical columns, said lower support runners having ends fixedly connected to a primary cross brace to structurally support and substantially maintain a parallel relation of said lower support runners, said primary cross brace having a wheel mounted thereto for supporting and carrying said trailing carriage;
 a hinge mechanism having a pair of outward cylinders fixedly attached to an upper surface of the fourth horizontal support and an intermediate cylinder mounted to a forward cross support of the engine support frame and configurably aligned with and situated in between each of said outward cylinders, said outward and intermediate cylinders each having an interior cylindrical space for slidably receiving and accommodating therewithin a rod;
 a pair of receptacle holders for receiving therewithin an equal number of receptacle bins suited to receive and store collected debris, said receptacle holder having hinging means for allowing said receptacle holder to angularly travel relatively apart from said lower support runner;
 a receptacle hood having a top panel fixedly joined along its perimeter by a sidewall and a bottom panel fixedly joined to bottom opposing sections of the sidewall to form a pair of receptacle openings each being substantially positioned above said receptacle bin, said receptacle hood having an entry port coupled to said exit port of the blower housing;
 exterior sealing means for sealing circumferential openings formed in between upper circumferential portions of the receptacle bins and said receptacle openings;
 a pair of vent enclosures each being situated above said receptacle bin and having a vent opening on a rearward face thereof and a lower opening substantially coinciding with said receptacle opening and an opening extending through said top panel;
 hood elevating means for elevating said receptacle hood apart and away from said receptacle bins; and
 a lift assembly for lifting said trailing carriage apart and away from said mountable hitch, said lift assembly having left and right side arms positioned relatively parallel to one another and along and below said engine support frame, said side arms each having a first end equipped with a wheel and a second end pivotally connected to said lower support runner, said lift assembly having movable means for raising and lowering said side arms relative to said engine support frame.

17. A vacuum collector assembly as set forth in claim 16, wherein said hood elevating means comprises a hood raising assembly dedicated to each of said vertical columns, said hood raising assembly having a pair of lower spring mounts each mounted in an opposing relation on said vertical column, a pair of springs each having first and second j-shaped ends, and a pair of side-by-side planar members each having a first common end fixedly mounted to an external surface of the vent enclosure and a second common end engaging opposing sides of the vertical column, said second ends and said vertical column each having an aperture extending therethrough and configurably aligned for receiving and accommodating therewithin a pin, said pin having a pair of protruding sections each positioned in an opposing relation for receiving said first j-shaped end of the spring, said spring mount having an eye bolt with a looped end for receiving said second j-shaped end.

18. A vacuum collector assembly as set forth in claim 16, wherein said movable means comprises a trailer jack mountable at its lower end to a cross beam extending between said left and right side arms and at its midsection to one of two vertical braces supplementing support of said engine support frame, said trailer jack having internal gearing substantially made operable by an extension rod, said extension rod having a handle to effect rotation thereof while simultaneously moving a lower member of the trailer jack relatively about and within an upper sleeve of the trailer jack to effect angular travel of said trailing carriage relative to said mountable hitch.

19. A vacuum collector assembly for attachment to a lawn tractor having a rearward main frame and a lawn cutting deck equipped with an outward chute, said assembly comprising, in combination:
 a mountable hitch having pairs of forward and rearward support posts fixedly connected to one another by first, second, third, and fourth horizontal supports to substantially form a box-framed structure, said forward and rearward support posts each having connective ends fixedly connected to the rearward main frame;
 a trailing carriage having an engine support frame for mounting thereon an engine having an output shaft affixed to an impeller assembly for developing negative pressure within a blower housing, said blower housing having an exit port and an intake port for receiving a section of piping extending from the outward chute, said engine support frame being fixedly connected to and extending outwardly from a pair of vertical columns, said vertical columns having bottom ends respectively connected to lower support runners extending relatively perpendicular to said vertical columns, said lower support runners having ends fixedly connected to a primary cross brace to structurally support and substantially maintain a parallel relation of said lower support runners, said primary cross brace having a wheel mounted thereto for supporting and carrying said trailing carriage;

a hinge mechanism having a pair of outward cylinders fixedly attached to an upper surface of the fourth horizontal support and an intermediate cylinder mounted to a forward cross support of the engine support frame and configurably aligned with and situated in between each of said outward cylinders, said outward and intermediate cylinders each having an interior cylindrical space for slidably receiving and accommodating therewithin a rod;

a pair of receptacle holders for receiving therewithin an equal number of receptacle bins suited to receive and store collected debris, said receptacle holder having hinging means for allowing said receptacle holder to angularly travel relatively apart from said lower support runner;

a receptacle hood having a top panel fixedly joined along its perimeter by a sidewall and a bottom panel fixedly joined to bottom opposing sections of the sidewall to form a pair of receptacle openings each being substantially positioned above said receptacle bin, said receptacle hood having an entry port connected to said exit port of the blower housing, said top panel having an pair of openings extending therethrough, said receptacle hood having an inner chamber for housing a vent basket attached to and suspended below each of said openings of the top panel and incoming and internal flow baffles functionally serving to direct the incoming mixed flow of air and debris cyclonically downward into each of said receptacle bins;

exterior sealing means for sealing circumferential openings formed in between upper circumferential portions of the receptacle bins and said receptacle openings;

a pair of vent enclosures each being situated above said receptacle bin and having a vent opening on a rearward face thereof and a lower opening substantially coinciding with said receptacle opening and said opening extending through said top panel;

a hood raising assembly dedicated to each of said vertical columns, said hood raising assembly having a pair of lower spring mounts each mounted in an opposing relation on said vertical column, a pair of springs each having first and second j-shaped ends, and a pair of side-by-side planar members each having a first common end fixedly mounted to an external surface of the vent enclosure and a second common end engaging opposing sides of the vertical column, said second ends and said vertical column each having an aperture extending therethrough and configurably aligned for receiving and accommodating therewithin a pin, said pin having a pair of protruding sections each positioned in an opposing relation for receiving said first j-shaped end of the spring, said spring mount having an eye bolt with a looped end for receiving said second j-shaped end; and a lift assembly for lifting said trailing carriage apart and away from said mountable hitch, said lift assembly having left and right side arms positioned relatively parallel to one another and along and below said engine support frame, said side arms each having a first end equipped with a wheel and a second end pivotally connected to said lower support runner, said lift assembly having a trailer jack mountable at its lower end to a cross beam extending between said left and right side arms and at its midsection to one of two vertical braces supplementing support of said engine support frame, said trailer jack having internal gearing substantially made operable by an extension rod, said extension rod having a handle to effect rotation thereof while simultaneously moving a lower member of the trailer jack relatively about and within an upper sleeve of the trailer jack to effect angular travel of said trailing carriage relative to said mountable hitch.

20. A vacuum collector assembly as set forth in claim 19, wherein said impeller assembly comprises at least two outward extending blades in a balanced, opposing relation each having an inward end connected to an outward side of a cylindrical sleeve and an outward end of curvature shape to enhance conveyance of air within and through said blower housing as said impeller assembly rotates therewithin, said outward extending blades each having a leading edge fixedly attached to a backing plate.

\* \* \* \* \*